United States Patent [19]

Forest et al.

[11] 3,954,657
[45] May 4, 1976

[54] PROCESS FOR RECLAIMING RARE EARTH OXYSULFIDE PHOSPHOR MATERIAL

[75] Inventors: Harvey Forest, Skokie; James Harkin, Schiller Park, both of Ill.

[73] Assignee: Zenith Radio Corporation, Chicago, Ill.

[22] Filed: Nov. 21, 1974

[21] Appl. No.: 525,897

Related U.S. Application Data

[63] Continuation of Ser. No. 360,277, May 14, 1973, abandoned.

[52] U.S. Cl. ............................. 252/301.4 S; 423/21
[51] Int. Cl.² ........................................ C09K 11/46
[58] Field of Search ............ 252/301.4 R, 301.65 S; 23/293; 423/21, 263

[56] References Cited
UNITED STATES PATENTS

| | | | |
|---|---|---|---|
| 3,523,904 | 8/1970 | Single | 252/301.4 R X |
| 3,625,659 | 12/1971 | Hammond et al. | 252/301.4 R X |
| 3,740,342 | 6/1973 | Platt et al. | 252/301.45 X |
| 3,763,050 | 10/1973 | Dikhoff et al. | 252/301.45 X |

FOREIGN PATENTS OR APPLICATIONS

| | | | |
|---|---|---|---|
| 2,013,624 | 9/1971 | Germany | 252/301.4 R |

*Primary Examiner*—Jack Cooper
*Attorney, Agent, or Firm*—John H. Coult

[57] ABSTRACT

This disclosure depicts a process for reclaiming from contaminated color cathode ray tube screening waste rare earth oxysulfide phosphors, especially the red-emitting phosphor yttrium oxysulfide. The screening waste from which the phosphor material is to be reclaimed may contain, in addition to the phosphor material contaminants such as hardened photoresist material, blue-emitting and green-emitting zinc sulfide type phosphor materials and graphite. The novel phosphor reclaim process disclosed is characterized by having steps including subjecting the partially purified oxysulfide phosphor material to a wash in dilute nitric, acetic, hydrochloric or citric acid, preferably citric acid, in order to enhance the adherability of the reclaimed phosphor material during subsequent rescreening thereof. The phosphor material is subjected to a wash with sodium tri-polyphosphate to minimize during rescreening of the phosphor material cross-contamination of underlying blue-emitting or green-emitting phosphor materials. In accordance with another aspect of the disclosed reclaim process, graphite contaminants are separated from the phosphor material being reclaimed by suspending the graphite-contaminated phosphor material in an aqueous bath, adding tri-polyphosphate to the bath to cause the phosphor material to settle and then decanting the still suspended graphite.

6 Claims, No Drawings

PROCESS FOR RECLAIMING RARE EARTH OXYSULFIDE PHOSPHOR MATERIAL

RELATED APPLICATION

This application is a continuation of application Ser. No. 360,277, filed May 14, 1973, now abandoned.

BACKGROUND OF THE INVENTION

The invention is directed to the provision of a process for reclaiming rare earth oxysulfide phosphors, especially yttrium oxysulfide, after screening of the phosphor on the faceplate of a color cathode ray tube. As used herein, a phosphor reclaim process is a series of chemical and/or physical steps which converts the excess phosphor collected from screen development, skirt trim and other steps in the manufacture of color cathode ray tubes into virgin quality powder which is available for reuse.

The high costs of rare earth phosphors such as yttrium oxysulfide has motivated phosphor makers and phosphor users to develop processes for reclaiming these phosphor materials from contaminated screening wastes collected during color cathode ray tube screening operations. A number of phosphor reclaim processes have been developed and placed into commercial use which are directed to purifying the reclaimed phosphor to a state of virgin quality. It has been found, however, that it is not sufficient merely to restore the purity of a used phosphor material by removing screening contaminants. The phosphor material must also be given good screening properties. The properties that cause a phosphor material to "screen" satisfactorily may be stated as follows:

1. The phosphor material must adhere to the surface of a cathode ray tube faceplate (glass). In "black surround" tubes, such as the CHROMACOLOR-brand tubes manufactured by the assignee of this invention, the phosphor material must also adhere to a layer used to form the "black surround" (typically graphite).

2. The phosphor material must have a high resistance to cross-contamination of earlier-deposited phosphor materials. "Cross-contamination" is herein intended to mean the adherence of particles of one phosphor material upon previously deposited phosphor elements having another color emission characteristic. For example, when the blue-emitting phosphor material, typically deposited subsequent to the deposition of the green phosphor material, is contaminated by particles of later-deposited red-emitting phosphor material, upon energization of the blue-emitting phosphor, its emission spectrum will be altered due to the presence of the red phosphor particles.

The property of a reclaimed rare earth oxysulfide phosphor material to adhere to its substrate during rescreening has been addressed by prior art reclaim processes. It is common practice to subject such reclaimed phosphor materials during a reclaim process to a wash in nitric acid in order to attack and cleanse the outer surface of the phosphor particles. The use of nitric acid to enhance the adherability of a reclaimed phosphor material has proven successful, however this process has a number of drawbacks:

1. Nitric acid is undesirably costly.
2. The high corrosiveness of nitric acid results in a relatively high yield loss in the reclaimed phosphor - for example, 3–4%, or more.
3. The use of nitric acid requires extensive afterwashing in order to adequately cleanse the reclaimed phosphor material.
4. Nitric acid causes the reclaimed phosphor material to clump, requiring an undesirable amount of blending and sifting and thus undesirable abrasion of the phosphor particles, in order to restore the phosphor material to a loose, powdery state.

The problems associated with the tendency of a reclaimed phosphor material to cross-contaminate have not been overcome by prior art processes. It is known that certain reclaims processes involve subjecting the reclaimed phospor material to a wash in ammonium carbonate in order to improve its resistance to cross-contamination. It has been found, however, that such prior art processes do not significantly affect the tendency of a reclaimed phosphor material to cross-contaminate.

Prior art phosphor reclaim processes have also been found to be deficient in their effectiveness in separating graphite contaminants from the phosphor material being reclaimed.

No prior art pertinent to this invention is known. The following patents disclose the use of basic compounds in connection with the treatment of phosphor materials or the screening thereof, however, their respective disclosures are conspicuously remote from the teachings of the present invention: U.S. Pat. Nos. 3,676,177; 3,568,629 and 3,523,904.

OBJECTS OF THE INVENTION

It is a general object of this invention to provide an improved process for reclaiming red-emitting rare earth oxysulfide phosphor materials, especially yttrium oxysulfide, from contaminated cathode ray tube screening waste.

It is a less general object to provide an improved rare earth oxysulfide phosphor reclaim process which yields reclaimed phosphor material having improved rescreenability, i.e., improved adherability and resistance to cross-contamination.

It is another object to provide such a phosphor reclaim process which can be performed with a reduced number of reclaim steps, which uses relatively low cost materials, which results in reduced overall reclaim process time and reduced labor requirements and which is compatible with existing phosphor reclamation equipment and processes.

It is still another object to provide a process for reclaiming rare earth oxysulfide phosphors which has a relatively high yield factor and which yields a reclaimed phosphor material which is extremely pure and which has less tendency to clump than phosphor materials reclaimed by certain prior art processes.

It is a further object of this invention to provide a process for reclaiming from color cathode ray tube screening waste rare earth oxysulfide phosphor materials which includes an improved sub-process for separating graphite contaminants from the phosphor material being reclaimed.

The features of the invention which are believed to be novel are set forth with particularity in the appended claims. The invention, together with further objects and advantages thereof, may best be understood, however, by reference to the following description.

DESCRIPTION OF THE PREFERRED EMBODIMENT

This invention is directed to the provision of an improved process for reclaiming rare earth oxysulfide phosphor materials, especially yttrium oxysulfide, from contaminated cathode ray tube screening waste. The phosphor reclaim process with which this invention is concerned may be better understood after a brief preliminary description of the condition of the tube faceplate before it is screened with the red phosphor material, and a brief description of the red phosphor screening process.

The process of this invention has general applicability, however it will be described in connection with the screening of a color cathode ray tube of the "negative guardband" character which has on the tube faceplate a light-absorptive grille, composed typically of a graphite material, having a pattern of grille openings formed therein over which the green-emitting, blue-emitting and red-emitting phosphor elements are deposited. Typically, the graphite layer is deposited directly upon the inner surface of the faceplate. By the use of photo-exposure techniques, the afore-described pattern of grille openings is formed in the graphite layer. The green phosphor material, typically a zinc, cadmium sulfide compound, is then deposited upon the faceplate, covering the grille. By employing photo-exposure techniques, all of the green phosphor layer is removed except for a pattern of phosphor elements overlying a selected pattern of openings in the grille.

By a similar screening process, a pattern of blue phosphor elements, typically formed also from a zinc sulfide phosphor material, is deposited over a second pattern of grille openings. The partially screened panel, as described, is thus ready for the screening of the red phosphor material.

The red-emitting yttrium oxysulfide phosphor material, carried in a photoresist, is screened over the panel in a uniform layer. The layer makes contact with (1) faceplate (bare glass) areas through the grille openings assigned to the red-emitting phosphor elements, (2) the graphite grille, and (3) the patterns of blue-emitting and green-emitting phosphor elements. It is desirable that the red-emitting phosphor material adhere firmly and uniformly to the glass faceplate surfaces and to the graphite grille, but that it not adhere to the blue-emitting and green-emitting phosphor elements, i.e., that the material have good screening properties.

After the layer of red-emitting phosphor material has been suffused on the panel, by the use of photo-exposure techniques the layer is developed, leaving in the remaining open windows in the graphite grille a pattern of red-emitting phosphor elements. During development of the red-emitting phosphor layer, the photoresist vehicle (typically chromium-sensitized polyvinyl alcohol), residual deposits of graphite and residual deposits of blue-emitting and green-emitting phosphor material, here assumed to be zinc sulfide compounds, are collected as waste from the screening operation.

In preparation for the reclaim process, the screening waste washed down from the red (emitting) phosphor screening operation is collected and centrifuged to form a moist phosphor cake. In accordance with a preferred implementation of this process invention, the red-emitting rare earth oxysulfide phosphor material is reclaimed from the contaminated screening waste in accordance with the following reclamation process.

First, the chromium-sensitized, hardened polyvinyl alcohol (PVA) is removed from the screening waste by dissolving it in a caustic wash. This wash is preferably in sodium hydroxide for approximately 1–2 hours at about 120°F at a pH of approximately 12 or higher. The residual material is cleansed by a number of washes in hot deionized water until all of the hardened PVA is eliminated. The material is then filtered.

The partially reclaimed phosphor material is then baked, preferably for approximately 2 hours at 1000°F, in order to oxidize the graphite contaminant and the zinc sulfide blue-emitting and green-emitting phosphor materials. Oxidation of the zinc sulfide materials quenches the luminescence of these phosphor materials.

After the baking operation, the material being reclaimed is subjected to a wash in a hot dilute acid in order to remove the oxide or oxysulfate coating on the red phosphor material and oxidized zinc compounds that may be produced by the baking operation. The adherability of the reclaimed phosphor material during subsequent rescreening operations is thus enhanced. The acid may be nitric acid, acetic acid, hydrochloric acid, or, preferably citric acid. The use of citric acid constitutes an aspect of this invention which will be described below in detail.

In a preferred form of the acid treatment operation, reagent grade citric acid is used in a concentration of 2% by weight for a 20% aqueous phosphor suspension. The water bath is preferably deionized water maintained at 120°F. The acid wash is preferably performed with continual stirring for approximately 2 hours.

The described acid wash attacks and cleanses the surfaces of the phosphor particles and in so doing dissolves a certain amount of yttrium, a rare earth constituent of the phosphor material. The yttrium oxysulfide phosphors in commercial use at the present time are usually doped with europium, a rare earth material also. The described acid wash treatment dissolves and ionizes yttrium and europium from the phosphor compound, both of which are expensive rare earth materials. It is desirable to recover these dissolved rare earth ions by rinsing them, after the acid wash, from the reclaimed phosphor material with hot deionized water. The rare earth ions may be recovered from the rinse by an oxatic acid precipitation process, a process which is well known in the trade.

In accordance with an important aspect of this invention, in order to minimize the tendency of the reclaimed rare earth oxysulfide phosphors, upon rescreening, to cross-contaminate the green-emitting and blue-emitting phosphor elements, the now purified phosphor material is subjected to a wash with sodium tri-polyphosphate. The sodium tri-polyphosphate treatment has proven to be very successful when the sodium tri-polyphosphate is used in a concentration of about 0.2% by weight (.2 pounds per 100 pounds of water) is deionized water at about 120°F. The wash may be maintained for about 1 hour. It has been found that by treating the reclaimed phosphor material with sodium tripolyphosphate, as described, the tendency of the reclaimed phosphor to cross-contaminate is markedly reduced. There is no evidence of any residual sodium tri-polyphosphate remaining on the phosphor material after the described treatment.

After treating the reclaimed phosphor material with sodium tri-polyphosphate, the material is preferably washed a number of times in hot deionized water in order to completely cleanse the phosphor material of the sodium tri-polyphosphate.

The phosphor material is then filtered and flash dried, for example in a furnace maintained at about 650°F for about 30 minutes. The reclaimed phosphor material will appear in a dry cake form at this point. In order to remove all clumps from the material and convert it to a fine powder, the material is pulverized by tumbling in a blender and subsequent sifting. The resultant phosphor material has been found to have the purity and screening qualities of virgin phosphor material.

The above-described novel citric acid treatment will be described in more detail. As discussed briefly above, the use of a wash in citric acid constitutes a novel aspect of this invention. The use of citric acid rather than nitric acid, for example (as is customary in prior art processes), has a number of significant advantages.

It has been found that the yield losses which result from the use of citric acid (as a result of the dissolution of phosphor material) are typically less than 1% as opposed to yield losses of 3–4% when nitric acid is used.

Secondly, if the loss of the less than 1% dissolved phosphor material is of no concern, it has been found that the water washing operations between the citric acid wash and the sodium tri-polyphosphate treatment may be eliminated to reduce the overall cost of the reclamation process. It has been found that it is possible to add the sodium tri-polyphosphate directly in the acid bath without significantly affecting the efficacy of the sodium tri-polyphosphate treatment. The sodium tri-polyphosphate may be added to the citric acid bath after allowance of adequate time for the citric acid to act upon the phosphor material. The elimination of intervening water washes is not possible with nitric acid. If nitric, rather than citric, acid is used, at least three water wash operations appear to be necessary to adequately prepare the phosphor material for the sodium tri-polyphosphate treatment.

Thirdly, the use of citric acid, rather than nitric acid, has the advantage that the resultant reclaimed phosphor material has a significantly lower tendency to clump. Consequently, the afore-described pulverizing operation, which results in undesirable abrasion and consequent loss of emission efficiency of the reclaimed phosphor, can be reduced in time and severity.

Fourthly, it is advantageous to use citric acid, rather than nitric acid, in the acid wash treatment for reasons of economy - citric acid is less expensive than nitric acid.

Fifthly, citric acid is less corrosive than nitric acid, making it less dangerous to work with and more compatible with standard processing equipment. Further, citric acid is available in solid form making it easier to deliver and handle than nitric acid which is available only in liquid form.

The above-described reclaim process is preferred, all commercial considerations being taken into account. However, in applications wherein adherability of the reclaimed phosphor material is deemed to be of greater importance than the yield factor, the above-described preferred process may be modified as follows.

Prior to the acid treatment step, the baked waste may be subjected to a wash with hot hydrogen peroxide. The hydrogen peroxide treatment may take the form of a treatment in a bath of hydrogen peroxide in deionized water at a concentration of about 3% maintained at a temperature of about 120°F. The pH of the bath is preferably maintained in the range of about 1–2. The baked waste is added to the bath and stirred for at least 1 hour. The waste is then rinsed at least once in deionized water to remove the hydrogen peroxide.

It has been found that a wash with hydrogen peroxide followed by the described acid treatment yields reclaimed phosphor materials having extremely favorable adherability characteristics. The addition of the hydrogen peroxide treatment, however, increases the cost of the reclamation process in two respects – the separate hydrogen peroxide treatment introduces a cost element, and secondly the use of hydrogen peroxide results in a higher yield loss factor.

It is a stated object of this invention to provide an improved process for separating graphite contaminants from the oxysulfide phosphor material being reclaimed. To this end, it has been found that sodium tri-polyphosphate, added to a suspension of graphite and phosphor material, will cause the phosphor material to settle rapidly while permitting the graphite to remain in suspension. The graphite suspension may be decanted to remove substantially all of the graphite contaminant. The settled phosphor material has been found to have near-virgin body color.

In the context of the above-described reclaim process, it has been found that the sodium tri-polyphosphate treatment serves a dual role -(1) to enhance screenability, as described and (2) to cause the reclaimed phosphor material to selectively settle out, permitting decantation of any remaining graphite which has not been burned off in the first baking operation.

The invention is not limited to the particular details of the processes depicted, and other modifications and applications are contemplated. For example, the afore-described process, while being particularly advantageous when a citric acid wash is used, may be carried out using an acid wash with nitric acid, acetic acid or hydrochloric acid. Acetic acid has the disadvantage of being odorous; hydrochloric acid is excessively corrosive and requires the use of glass lined process equipment. Other changes may be made in the above-described methods and apparatus without departing from the true spirit and scope of the invention herein involved and it is intended that the subject matter in the above depiction shall be interpreted as illustrative and not in a limiting sense.

We claim:

1. In the reclamation of yttrium oxysulfide phosphor material from contaminated cathode ray tube screening waste which contains, in addition to said phosphor material, contaminants including zinc sulfide phosphor materials, the process comprising:

baking the waste to oxidize the said zinc sulfide phosphor materials and thereby quench the luminescence thereof in the waste;

subjecting the waste to a wash in a hot dilute aqueous acid selected from the group consisting of nitric acid, citric acid, acetic acid and hydrochloric acid to remove oxide and oxysulfate coatings on the phosphor material and to remove oxidized zinc compounds present, to thereby improve the adherability of the reclaimed phosphor material during rescreening thereof; and subjecting the phosphor material to a dilute aqueous wash with sodium tri-polyphosphate to minimize, during rescreening of the reclaimed material, cross-contamination of previously screened phosphor materials.

2. The process defined by claim 1 wherein said sodium tri-polyphosphate is used in a concentration of about 0.2% by weight.

3. In the reclamation of the red-emitting phosphor material, yttrium oxysulfide, from contaminated cathode ray tube screening waste which contains, in addition to said phosphor material, contaminants including blue-emitting and green-emitting zinc sulfide phosphor materials, the process comprising:

baking the waste to oxidize said zinc sulfide phosphor materials and thereby quench the luminescence thereof;

improving the adherability of the oxysulfide phosphor material during rescreening thereof by subjecting the waste to an aqueous wash in hot dilute citric acid at an elevated temperature and for a time interval sufficient to remove oxysulfate coatings on the phosphor material and to remove oxidized zinc compounds present; and subjecting the partially reclaimed oxysulfide phosphor material to a wash with dilute aqueous sodium tri-polyphosphate to minimize, during subsequent rescreening of the reclaimed phosphor material, cross-contamination of previously screened phosphor materials.

4. The process defined by claim 3 wherein said sodium tri-polyphosphate is used in a concentration of about .2% by weight.

5. In the reclamation of yttrium oxysulfide phosphor material from contaminated cathode ray tube screening waste which contains, in addition to said phosphor material, contaminants including zinc sulfide phosphor materials, the process comprising:

baking the waste to oxidize the said zinc sulfide phosphor materials and thereby quench the luminescence thereof; and the other oxidizable constituents of the waste;

subjecting the oxidized waste to a wash in a dilute hot aqueous hydrogen peroxide bath having a pH of about 1–2, and subsequently to an aqueous wash in a hot dilute acid selected from the group consisting of nitric acid, citric acid, acetic acid and hydrochloric acid at for a time interval sufficient to remove oxide and oxysulfate coatings on the phosphor material and to remove oxidized zinc compounds present, to thereby enhance the adherability of the reclaimed phosphor material during rescreening thereof; and subjecting the phosphor material to a dilute aqueous wash with sodium tri-polyphosphate to minimize, upon rescreening of the reclaimed oxysulfide phosphor material, cross-contamination of previously screened phosphor materials.

6. The process defined by claim 5 wherein said sodium tri-polyphosphate is used in a concentration of about 0.2% by weight.

* * * * *